No. 854,034. PATENTED MAY 21, 1907.
F. S. HANDY & W. J. HICKEY.
HOOF PAD.
APPLICATION FILED FEB. 17, 1906.
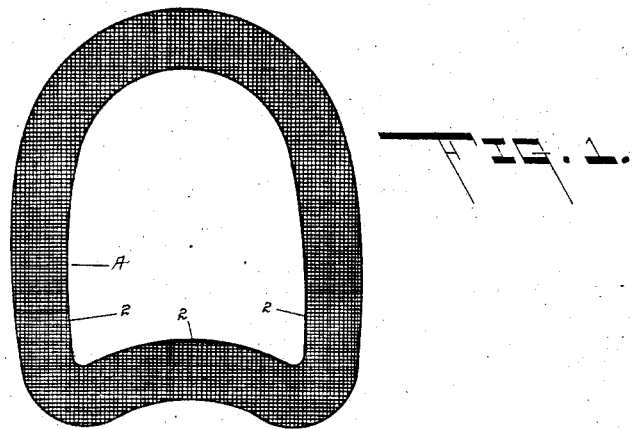
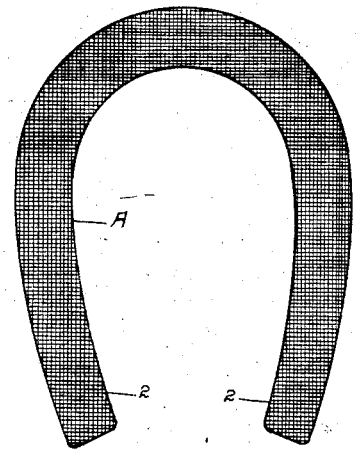
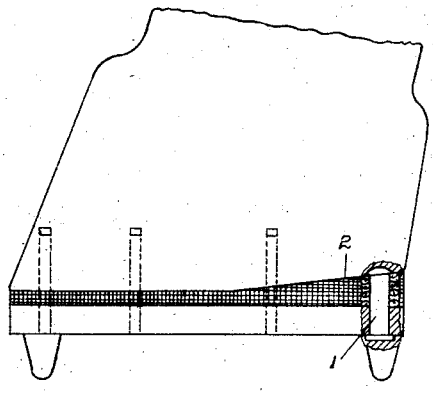
WITNESSES:
Roy Wallis
A. A. Eastesly
INVENTORS:-
Frank S. Handy
William J. Hickey
BY
Geo. B. Willcox ATTORNEY

UNITED STATES PATENT OFFICE.

FRANK S. HANDY AND WILLIAM J. HICKEY, OF BAY CITY, MICHIGAN.

HOOF-PAD.

No. 854,034.

Specification of Letters Patent.

Patented May 21, 1907.

Application filed February 17, 1906. Serial No. 301,678.

*To all whom it may concern:*

Be it known that we, FRANK S. HANDY and WILLIAM J. HICKEY, citizens of the United States, residing at Bay City, in the county of Bay and State of Michigan, have invented certain new and useful Improvements in Hoof-Pads; and we do hereby declare the following to be a full, clear, and exact description of the invention, such as will enable others skilled in the art to which it appertains to make and use the same.

This invention relates to a hoof pad and more particularly to a hoof pad constructed of felt or equivalent material, one object of which is the provision of a cushion for the hoof of a horse, which cushion shall be absorbent to retain moisture to prevent the hoof from becoming dry and keep it healthy.

To these ends our invention consists in the provision of a hoof pad which is inexpensive in the extreme and yet highly efficient in operation.

In the accompanying drawings Figure 1 is a top plan view of a hoof pad adapted to fit a bar shoe. Fig. 2 is a similar view showing a hoof pad constructed to fit an open shoe, and Fig. 3 is a view in side elevation showing the hoof pad applied to the hoof of a horse.

A indicates the hoof pad which is preferably constructed of a textile fabric as felt for instance, and, as will be seen from inspection of Figs. 1 and 2, the pad is preferably shaped to conform to the horse shoe with which it is designed to be used, thus leaving the frog of the hoof fully exposed to permit it to be treated whenever necessary.

We also preferably make the pad thicker at the heel than at the toe, as shown at (2) in order to raise the heel of the horse's hoof and relieve strain on the muscles. The heels of some horses' hoofs, if not supported in this manner, are inclined to drop down and often strain the tendons and tire the horse out much more quickly than if the heel is supported in a raised position.

By the use of a cushioning textile material, such as felt for instance, the shoe is retained on the hoof and prevented from coming loose owing to the elasticity and expansion of the pad. When the blacksmith nails the shoe directly onto the hoof and clenches the nails on the outside, as is usual without the pad, the shoe frequently becomes loose owing to the jar imparted when the horse is in motion. We have actually demonstrated that when our pad is interposed between the hoof and the shoe, the latter never becomes loose.

The absorbent nature of the material of which the pad is composed is such as to keep the hoofs moist and in healthy condition, and by reason of its open construction, the frog of the hoof may be packed or treated while the shoe remains in place, as for instance by placing the hoof in a soaking tub, the pads retaining the moisture for many hours after the hoof is removed from the tub and operating to reduce fever in the hoof.

The horse shoes run in sizes from 1 to 7, and hoof pads constructed according to our invention may be made in the same sizes as the horse shoes, with the bar or without and if the blacksmith is out of the exact size or shape of hoof pad wanted, and makes a special shaped shoe, the pad can be slightly stretched or shaped to fit the shoe.

We have found our invention particularly adapted to use in connection with contracted or sore hoofs. As is well-known, horses' hoofs are subject to corns, which may be due to the fact that the calks on one side of the shoe have worn down more than those on the other side or have been broken off, thus throwing the weight of the horse to one side or the other of the hoof. By the use of our hoof pad, the unequal pressure of the horse's hoof on the shoe, while not entirely equalized, is cushioned so that the formation of the corn is absolutely avoided.

In driving horses over paved or hard roads they frequently "pound" and the resultant injury to the hoof which the "pounding" would cause is obviated by the use of our hoof pad acting as a cushion; and furthermore the pad will absorb moisture from sprinkled streets sufficient to keep the horse's hoof soft and permit it to spread if contracted. If a horse's hoofs are dry and hard they will not spread.

In applying the pad to a horse's hoof, the shoe is first shaped to the hoof, the pad applied thereto and it may be riveted to the shoe as shown in the drawings at (1), either to the bar of a closed shoe or to the heel of an open shoe. This riveting, however, is not necessary, as the shoe when nailed to the hoof will retain the pad in position, the heel of the pad resting lightly upon the shoe and not being secured thereto or to the hoof when the rivet is not used. The pad and hoof can then be rasped down even with the outer periphery of the shoe and the pad will wear as long or longer than the shoe. The pad rasps as smoothly as the hoof itself, an advantage not attained by various rubber pads now in use. Our pad is easily fitted to the hoof by rasping, and is thereby distinguished from rubber and other composition pads that cannot be rasped successfully and are consequently fitted by rasping the hoof to fit the pad, rather than, as in our case, making the pad fit the hoof.

We are aware that leather pads have been used heretofore, such pads covering the entire tread of the hoof and being adapted to hold a mixture of tar and oakum with which the horse's hoof may be stuffed, but such pads are apt to become hard and brittle, keeping the hoof dry and permitting the hoof to harden and crack. Furthermore the leather pad, if left in position on the hoof longer than necessary, will cause thrush.

We are also aware that heavy pads of rubber have been constructed, but our invention is much superior to rubber hoof pads since the felt will not heat the hoof as does rubber, especially when used in summer on hot pavements. Instead, the felt hoof pad serves as a sort of insulator for the hoof against heat and is more flexible and yielding than rubber. The rubber pads also tend to make the hoof sore and are more expensive, besides drawing the hoof and making it feverish. Then again, the rubber pad cannot be rasped down even with the edges of the shoe as can the textile pad, as above noted.

It will thus be seen that we have devised a simple and neat, yet inexpensive absorbent elastic cushioning means adapted to be interposed between the shoe and hoof of a horse, and which means possesses important advantages over other constructions with which we are familiar.

Having thus fully described our invention, what we claim as new is—

The combination with a horse shoe, of a horse shoe pad composed entirely of felt and conforming in shape to the shape of the horse shoe, the central portion being wholly cut away to expose the frog of a hoof, the heel portion of the pad being connected by means of a bar composed of the same material as the pad and a rivet passing through and connecting the pad to the hoof, the pad capable of being easily rasped with the shoe.

In testimony whereof we affix our signatures in presence of two witnesses.

FRANK S. HANDY.
WILLIAM J. HICKEY.

Witnesses:
A. A. EASTERLY,
RALPH S. WARFIELD.